Patented Aug. 29, 1933

1,924,456

UNITED STATES PATENT OFFICE

1,924,456

INTERMEDIATE AND DYESTUFF OF THE DIBENZANTHRONE SERIES

Melvin A. Perkins, Carneys Point, N. J., assignor to E. I. du Pont de Nemours & Company, Wilmington, Del., a corporation of Delaware No Drawing. Application February 11, 1930
Serial No. 427,654

19 Claims. (Cl. 260—61)

This invention relates to an organic chemical compound and a method of producing it. More particularly it relates to a dyestuff intermediate of the benzanthrone series and dyestuffs produced therefrom.

An object of the invention is to produce new and valuable chemical compounds. Other objects are to produce dyestuffs intermediates of a novel type, to develop a new and improved process of producing benzanthrone derivatives, to develop a process of producing Bz-1-Bz-1'-benzanthronyl compounds which avoids the use of an acid binder, and to produce dyestuffs of distinctive shades and superior properties. Other objects will appear hereinafter.

These objects are accomplished by the following invention whereby a compound having the probable structural formula

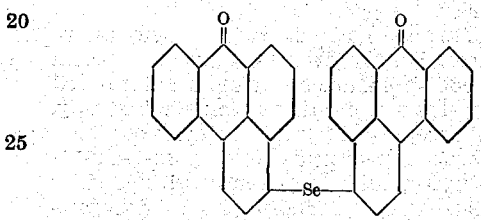

is produced.

The compound may be produced by heating Bz-1-halogen-benzanthrone with selenium powder in a high-boiling solvent, preferably one which is rich in hydrogen, with or without some additional substance capable of reacting readily with a halogen, a halogen acid, or both. There is obtained as a result of this process a benzanthronyl derivative containing chemically bound selenium. This derivative crystallizes readily from suitable solvents in thick, pointed needles of a golden yellow color. The probable final reaction may be represented as follows:

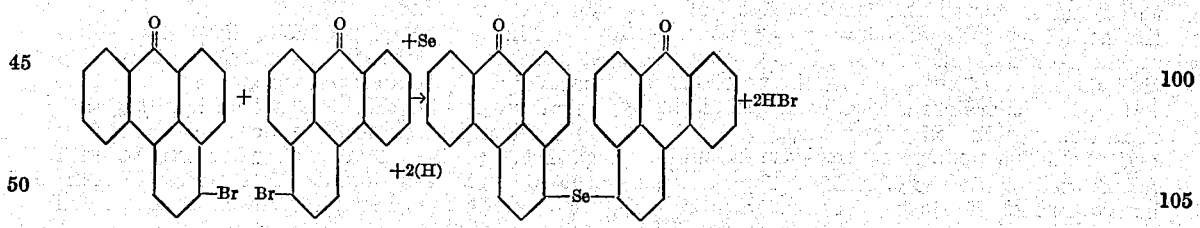

The hydrogen indicated in the above equation is very likely furnished by the solvent.

The invention will be readily understood from consideration of the following specific examples. The proportions are given by weight.

Example I

One hundred (100) parts of Bz-1-bromobenzanthrone, 14 parts of fine selenium powder, and 20 parts of powdered lime are stirred vigorously and heated eight hours at 220° C. in 500 parts of high-boiling kerosene or until the solid reaction product gives a strong green-blue coloration when dissolved in concentrated sulphuric acid. Since Bz-1-bromobenzanthrone gives a red coloration in sulphuric acid, this color test gives indication of the extent of the reaction. After the reaction is complete, the mixture is cooled to 50° C. and filtered, washed thoroughly with hot water, dried and delimed by hydrochloric acid.

Example II

To a solution of 100 parts of Bz-1-bromobenzanthrone in 300 parts of trichlorobenzene is added 200 parts of high-boiling kerosene and 14 parts of selenium, and the whole is heated at 210°–220° C. until the reaction product gives a green-blue coloration when dissolved in concentrated sulphuric acid. The solution is then cooled and the reaction product filtered off and dried. The product is similar to that obtained in Example I, but free from lime or inorganic salts.

Example III

Bz-1-chlorobenzanthrone (60 grams), prepared by chlorination of benzanthrone in orthodichlorobenzene or nitrobenzene by means of sulphur chloride or chlorine gas, is dissolved in tetrahydronaphthalene (300 grams); sodium acetate (20.5 grams) and selenium (10.0 grams) are then added and the mixture heated to reflux temperature until a test sample gives a clear greenish-blue solution in concentrated sulphuric acid. The mixture is then allowed to cool and the solid is separated, washed and dried as usual. The product is identical with that obtained in Examples I and II.

The product obtained by the above processes is a granular brownish-yellow powder, very sparingly soluble in cold organic solvents, but fairly soluble in hot nitrobenzene or ortho-dichlorobenzene, from which it crystallizes readily in thick, pointed needles of a golden yellow color. The product dissolves in concentrated sulphuric acid with strong, clear, very greenish-blue coloration. It is practically insoluble in alkaline sodium hydrosulphite. After extraction by sodium sulphide solution, to remove excess selenium, and recrystallization from nitro-benzene, the product shows a melting point of 336–337° C. and a selenium content of 14.97% by analysis. The theoretical percentage of selenium contained in Bz-1:Bz-1'-benzanthronyl selenide is 14.74.

*Example IV*

Dibromobenzanthrone (50 grams), made by further bromination of Bz-1-bromobenzanthrone in aqueous suspension, or by treating dry benzanthrone with excess liquid bromine, selenium (5.6 grams), and anhydrous sodium acetate (11.7 grams) are stirred into tetrahydro-naphthalene (250 grams) and the mixture heated to reflux for two hours or until a sample gives a bluish-green solution in concentrated sulphuric acid. The reaction mixture is then cooled, filtered, and the filter cake is washed with alcohol and finally with water and is then dried. The product is a brownish-orange powder, containing both bromine and selenium. It recrystallizes readily from hot nitrobenzene, giving thin curved needles of an orange color.

The Bz-1-Bz-1'-benzanthronyl-selenide may be readily condensed to form isoviolanthrone as will be obvious from the following example.

*Example V*

Twenty-six (26) parts of sodium are dissolved in 172 parts of 93% alcohol, the solution warmed to 80° C. and 198 parts of flaked caustic potash added. After this has been stirred one-half hour, the temperature is adjusted to 110° to 120° C. and 100 parts of the intermediate, Bz-1-Bz-1'-benzanthronyl selenide, slowly added, after which the temperature is raised to 135° to 140° C. and maintained for one hour. The melt is drowned in water, oxidized by air, and the dyestuff isolated in the usual manner. Selenium may be recoverd as such from the aeration mother liquor.

The process herein set out is not limited to unsubstituted Bz-1-bromobenzanthrone. Substituents may be joined to the Bz-1-bromobenzanthrone molecule so long as the "2" position is kept free. It is necessary to keep this position free if the Bz-1-Bz-1'-benzanthronyl selenide is to be condensed to isoviolanthrone. This will be clear from consideration of the formulas above submitted, which show that the reaction involves only the positions Bz1, Bz1' and is therefore generally not hindered by substituents in the other positions.

It should be understood that the invention is not limited to the use of a single Bz-1-halogen-benzanthrone. Various mixtures may be advantageously treated. In such cases the resultant Bz-1-Bz-1'-benzanthronyl selenide may or may not be symmetrical, or a mixture of various Bz-1-Bz-1'-benzanthronyl selenides may be produced. The exact composition of the product will depend upon such factors as solubility, chemical activity and the like.

Of the halogen compounds, Bz-1-chlorobenzanthrone and Bz-1-bromobenzanthrone are preferred. Especially good results have been obtained with Bz-1-bromobenzanthrone.

Other materials capable of reacting with halogen or halogen acid may be used in place of lime, for example, sodium acetate, sodium sulfite, sodium bisulfite, sodium carbonate or sodium benzoate. The corresponding ammonium salts or alkali metal salts such as potassium may be used for the sodium salts listed. As a further modification ammonia gas may be passed over the boiling mixture to accomplish a similar result. Although any high-boiling solvent may be used (or a low-boiling solvent under pressure) it is preferable to use a solvent which is readily halogenated, or one which is rich in hydrogen. Examples of these are high-boiling petroleum oils, hydrogenated naphthalenes such as the di-, tetra-, hexa-, or deca-hydronaphthalene, kerosene, paraffin or trichlorobenzene when mixed with any of these.

If a benzanthrone is present in the Bz-1-Bz-1'-benzanthronyl selenide fusion an increase in the yield of insoviolanthrone is obtained. The yield becomes greater with increases in the amount of the benzanthrone until the ratio of one molecule of benzanthrone to each molecule of Bz-1-Bz-1'-benzanthronyl selenide is reached.

The new selenium derivative of the benzanthrone series is a valuable intermediate for benzanthrone vat colors. Treatment of this intermediate, either alone or in conjunction with benzanthrone as indicated above by means of alkaline condensing agents produces insoviolanthrone of high purity.

Isoviolanthrone made from this new intermediate gives, directly, dyeings of good brightness and very reddish shade; and can be chlorinated with high yields of a product which yields strong, bright, and exceptionally reddish shades of violet. Isoviolanthrone prepared from Bz-1-Bz-1'-benzanthronyl-selenide apparently gives redder shades than that produced from dibenzanthronyl-sulfide.

As many apparently widely different embodiments of this invention may be made without departing from the spirit and scope thereof, it is to be understood that I do not limit myself to the specific embodiments thereof except as defined in the appended claims.

I claim:

1. Process of preparing derivatives of the benzanthrone series containing selenium, which consists in reacting selenium with a Bz-1-halogenated benzanthrone having a free 2-position.

2. The product resulting from heating Bz-1-halogen-benzanthrone with selenium in the presence of a solvent.

3. The method of producing Bz-1-Bz-1'-benzanthronyl selenide which comprises stirring 100 parts of Bz-1-bromobenzanthrone, 14 parts of fine selenium powder and 20 parts of lime together and heating substantially 8 hours at about 220° C. in 500 parts of high boiling kerosene or until the solid reaction product gives a strong green-blue coloration when dissolved in concentrated sulfuric acid.

4. A method of producing Bz-1-Bz-1'-benzanthronyl selenide which comprises stirring a mixture of selenium and Bz-1-bromobenzanthrone in the ratio of one atom of selenium with two molecules of Bz-1-bromobenzanthrone in high-boiling kerosene and heating at about 220° C. in the presence of enough lime to combine with the hydrobromic acid which is formed in the reaction, until a sample of the solid reaction product gives a green-blue coloration when dissolved in concentrated sulphuric acid, thereafter cooling to about 50° C., filtering, washing with hot water, drying and deliming.

5. The product which is substantially identical with that obtainable by condensing Bz-1-Bz-1'-benzanthronyl selenide in an alkali fusion.

6. The product of the formula X-Se-Y where X and Y may be alike or different and each stands for a benzanthronyl radical having a free 2-position.

7. The product which is substantially identical with that obtainable by condensing Bz-1-Bz-1'-benzanthrone selenide in the presence of alcoholic caustic alkali.

8. Textile material dyed with the dyestuff produced by fusing the product of claim 4 in a caustic alkali melt at about 110° C. to 120° C.

9. Textile material dyed with the dyestuff produced by fusing the product of claim 4 in a caustic alkali melt at about 110° C. to 140° C.

10. The process of preparing a benzanthrone derivative containing selenium, which comprises reacting with finely divided selenium upon a solution of a Bz1-halogen-benzanthrone having a free 2-position, in an organic solvent.

11. The process of preparing a benzanthrone derivative containing selenium, which comprises heating a solution of Bz1-halogen-benzanthrone, in an organic solvent which is rich in hydrogen, with finely divided selenium in the presence of an acid absorbing agent.

12. The process of preparing a benzanthrone derivative containing selenium, which comprises refluxing a mixture of Bz1-halogen-benzanthrone, tetrahydronaphthalene, sodium acetate and selenium, until a test sample gives a clear greenish blue solution in concentrated sulfuric acid.

13. The process of preparing a benzanthrone derivative containing selenium, which comprises heating to about 210–220° C. a mixture of Bz1-halogen-benzanthrone, high boiling kerosene, lime, and selenium, until a test sample gives no further a red color when dissolved in concentrated sulfuric acid.

14. A compound of the benzanthrone series, possessing the nuclear structure of Bz1, Bz1'-dibenzanthronyl selenide and being adapted to yield a dyestuff of the isoviolanthrone series by fusion with alcoholic caustic potash.

15. Bz1, Bz1'-dibenzanthronyl selenide.

16. A Bz1, Bz1'-dibenzanthronyl selenide which may be substituted by halogen but has no substituents in the 2,2'-positions.

17. A derivative of the benzanthrone series containing selenium, being substantially identical with the compound obtainable by reacting with selenium a Bz1-halogenated benzanthrone having a free 2-position.

18. The process of preparing a dyestuff of the isoviolanthrone series which comprises reacting a Bz1-halogen-benzanthrone having a free 2-position with selenium to give a Bz1-selenium-benzanthrone compound, and subjecting the latter to caustic fusion to form the corresponding isoviolanthrone compound.

19. The process which comprises reacting Bz1-halogen-benzanthrone with selenium to give Bz1, Bz1'-benzanthronyl-selenide, and subjecting the latter to caustic fusion to form isoviolanthrone.

MELVIN A. PERKINS.